(12) United States Patent
Hanai et al.

(10) Patent No.: US 6,692,853 B2
(45) Date of Patent: Feb. 17, 2004

(54) RECOVERY SYSTEM OF HEAT ENERGY IN A FUEL CELL SYSTEM

(75) Inventors: Satoshi Hanai, Wako (JP); Kiyoshi Kasahara, Wako (JP); Naoyuki Abe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 222 days.

(21) Appl. No.: 10/028,563

(22) Filed: Dec. 21, 2001

(65) Prior Publication Data

US 2002/0081473 A1 Jun. 27, 2002

(30) Foreign Application Priority Data

Dec. 22, 2000 (JP) ........................................ 2000-391702

(51) Int. Cl.[7] ........................... H01M 8/18; H01M 8/12; H01M 8/10
(52) U.S. Cl. ............................ 429/20; 429/26; 429/30
(58) Field of Search ......................... 429/13, 26, 30, 429/20, 19, 120, 12

(56) References Cited

U.S. PATENT DOCUMENTS 6,187,066 B1 * 2/2001 Benz et al. ............... 48/127.9
6,531,102 B1 * 3/2003 Nakamura et al. ............. 422/198

FOREIGN PATENT DOCUMENTS

| JP | 5-290865 | 11/1993 |
| JP | 7-192742 | 7/1995 |
| JP | 7-240223 | 9/1995 |

* cited by examiner

*Primary Examiner*—Patrick Ryan
*Assistant Examiner*—Thomas H. Parsons
(74) *Attorney, Agent, or Firm*—Lahive & Cockfield, LLP

(57) ABSTRACT

A fuel cell system 1 comprises a fuel cell stack 10, an evaporator 21, a reforming device 22, a supercharger 23, an offgas heating device 24, and a catalytic combustion chamber 25. Offgas exhausted from the fuel cell stack 10 is burnt in the catalytic combustion chamber 25, and the burnt offgas is introduced to the evaporator 21 to be heat exchanged with a reforming raw fuel and reforming air. The burnt offgas cooled by means of the heat exchange is introduced to the offgas heating device 24, to be used as a heat source for heating the offgas exhausted from the fuel cell stack 10. The offgas can be heated by the burnt offgas, and the moisture in the offgas can be vaporized and introduced to the catalytic combustion chamber 25.

9 Claims, 3 Drawing Sheets

RECOVERY SYSTEM OF HEAT ENERGY IN A FUEL CELL SYSTEM

BACKGROUND OF THE INVENTION

1. Field of the Invention

The present invention relates to an energy recovery system for offgas exhausted from a fuel cell in a solid polymer type fuel cell system.

2. Background Art

As one type of fuel cell system, there is one in which an alcohol type fuel, such as methanol and methane, and a hydrocarbon type fuel are reformed into a hydrogen-rich fuel gas by a reforming reactor, and this fuel gas and an oxidant gas (for example, air) are supplied to a fuel cell to generate power (Japanese Unexamined Patent Application, First Publication Nos. Hei 5-290865, Hei 7-192742 and Hei 7-240223).

Moreover, as a fuel cell system using a solid polymer type fuel cell, there is one in which a raw fuel of an alcohol type fuel and a hydrocarbon type fuel, such as methanol and gasoline, is heated by an evaporator to make fuel vapor, this fuel vapor is reformed into a hydrogen-rich fuel gas by a reforming reactor, and this fuel gas and an oxidant gas (for example air) are supplied as a reactant gas to an anode electrode side or a cathode electrode side of a fuel cell to generate power, the anode offgas and the cathode offgas exhausted from the fuel cell are guided to a catalytic combustion chamber to burn hydrogen remaining in the anode offgas, and the heat of the generated combustion gas is used as a heat source for the evaporator to evaporate the raw fuel.

With the solid polymer type fuel cell, adequate humidity is required at the time of generating power, and therefore in this fuel cell system, the reactant gas is humidified and supplied to the fuel cell. In addition, in the fuel cell, at the time of power generation by means of an electrochemical reaction of hydrogen and oxygen, water is generated, and this water is generated mainly on the cathode electrode side. Therefore, the cathode offgas is exhausted from the fuel cell with high humidity.

In this fuel cell system, heretofore, the anode offgas and the cathode offgas exhausted from the fuel cell are guided directly to the catalytic combustion chamber and burnt, and the generated combustion gas is directly exhausted to the atmosphere, after subjecting to heat-exchange with the raw fuel in the evaporator.

However, the operating temperature of the solid polymer type fuel cell is about 80°C., and this temperature is approximately the dew-point temperature of the cathode offgas. Therefore, if the offgas exhausted from the fuel cell is directly introduced to the catalytic combustion chamber, as described above, the offgas is cooled due to heat radiation along the offgas piping for guiding the offgas from the fuel cell to the catalytic combustion chamber. As a result, the moisture in the offgas is condensed to form water, and this water may be introduced to the catalytic combustion chamber together with the offgas. In this case, a part of the quantity of heat generated in the catalytic combustion chamber is consumed as latent heat of vaporization of the water. As a result, there is caused a problem in that the quantity of heat at an adequate temperature level required for evaporating the raw fuel cannot be supplied to the evaporator.

The present applicant has also developed the following technique and filed a patent application (not yet published), in order to improve the starting warm-up in a solid polymer type fuel cell system. This is for accelerating warm-up of the evaporator, and the construction is such that in parallel with the offgas pipe for supplying the offgas to the catalytic combustion chamber, a starting catalyst warm-up apparatus having an electric heater catalyst (hereinafter, abbreviated as "EHC") and a first fuel injection nozzle, and a second fuel injection nozzle which directly injects the fuel to the catalytic combustion chamber, are connected to an upstream portion of the catalytic combustion chamber.

At the time of startup of the fuel cell system, the electric heater of the EHC in the starting catalyst warm-up apparatus is energized and heated, and raw fuel (for example, methanol) is injected from the first fuel injection nozzle to thereby vaporize and bum the raw fuel by the EHC, and the combustion gas is supplied to the catalytic combustion chamber to heat the catalytic combustion chamber. As a result, when the catalyst in the catalytic combustion chamber is heated to a temperature higher than a low activation temperature, the raw fuel is directly injected to the surface of the catalyst in the catalytic combustion chamber from the second fuel injection nozzle, and the air for combustion is supplied to the catalytic combustion chamber via the offgas pipe, to completely burn the raw fuel injected from the second fuel injection nozzle in the catalytic combustion chamber, and the combustion gas is supplied to the evaporator to warm up the evaporator. As a result, early warm-up of the evaporator becomes possible, thereby enabling the fuel vapor to be supplied to the reforming device at an early stage, and early warm-up of the fuel cell system can be further promoted.

However, in the case where the injected amount of the raw fuel from the second fuel injection nozzle is increased for promoting warm-up in this fuel cell system, the raw fuel such as methanol requires a period for vaporization and temperature rise before combustion. Therefore, the time until reaching the burnt condition is long, and there may be a case where the fuel is discharged unburnt from the catalytic combustion chamber. Moreover, since in this case vaporization of the raw fuel is not sufficient, the raw fuel may be accumulated in the directly upstream portion of the catalytic combustion chamber, and flow into the catalytic combustion chamber to cause a hot spot (thermal nonuniformity). From such a reason, it has been difficult to promote warm-up by increasing the injection amount of the raw fuel from the second fuel injection nozzle.

BRIEF SUMMARY OF THE INVENTION

A fuel cell system of the present invention comprises: a solid polymer type fuel cell, to which a reactant gas is supplied to generate power; a combustion chamber which burns offgas exhausted from the fuel cell to generate a combustion gas; a first heating device which heats an object to be heated, by using heat of the combustion gas; and a second heating device which provides heat to the offgas by absorbing heat from combustion gas exhausted from the first heating device, on an upstream side of the combustion chamber.

By having such a construction, even if moisture in the offgas exhausted from the fuel cell is cooled and condensed to form condensed water as a result of heat radiation during the process until reaching the combustion chamber, this condensed water can be heated by the waste heat of the burnt offgas in the second heating device to thereby effect vaporization. Therefore, the condensed water does not flow directly into the combustion chamber. As a result, the situation can be prevented where a part of the quantity of generated heat in the combustion chamber is consumed by the latent heat of vaporization of water. Therefore thereby a necessary quantity of heat at an appropriate temperature level can be supplied to the first heating device.

Moreover, the waste heat in the burnt offgas can be recovered to the offgas, and the recovered quantity of heat can be added to the heat output by the combustion chamber and supplied to the first heating device, thereby enabling promotion of energy saving.

The object to be heated may be raw fuel of the reactant gas, and the first heating device may be an evaporator which evaporates the raw fuel.

By having such a construction, it becomes possible to supply the quantity of heat at an appropriate temperature level required for evaporating the raw fuel in a necessary amount required by the fuel cell. It also becomes possible to reduce the consumption of the raw fuel.

The fuel cell system may further comprises: a warm-up air supply device which supplies air for combustion of the combustion chamber from an upstream side of the second heating device, at the time of system startup; and a warm-up fuel supply device which supplies warm-up fuel to the combustion chamber, at the time of system startup.

By having such a construction, the air for combustion supplied from the warm-up air supply device can be heated by the second heating device, and at the time of startup of the system, the fuel for warm-up supplied from the warm-up fuel supply device can be heated to accelerate vaporization and temperature rise, thereby enabling acceleration of combustion of the warm-up fuel. Moreover, the situation can be prevented where the warm-up fuel supplied from the warm-up fuel supply device is supplied in an unburnt state to the first heating device. Therefore wastage of the warm-up fuel can be prevented. In particular, when the first heating device is an evaporator which evaporates the raw fuel of the reactant gas, early warm-up of the evaporator becomes possible, and early warm-up of the whole fuel cell system also becomes possible.

The combustion chamber may be a catalytic combustion chamber, and there may be provided a starting catalyst warm-up device which warms up the catalytic combustion chamber at the time of system startup, and the warm-up fuel supply device comprises a fuel injection nozzle which directly injects fuel to a catalyst in the catalytic combustion chamber By having such a construction, the starting catalyst warm-up device can activate the catalytic combustion chamber immediately after startup of the fuel cell system. Moreover, since the warm-up fuel is injected in a sprayed state from the fuel injection nozzle, it becomes possible to further accelerate vaporization and temperature rise of the warm-up fuel, thereby enabling further reduction of the warm-up time.

The catalytic combustion chamber may comprise a catalytic chamber which houses a catalyst and a heating chamber adjacently provided on an upstream side of the catalytic chamber, the second heating device is directly connected to the heating chamber, and the starting catalyst warm-up device and a fuel injection nozzle of the warm-up fuel supply device may be installed, facing the heating chamber.

By having such a construction, the second heating device and the catalytic combustion chamber can be arranged in proximity to each other. As a result, at the time of a warm-up operation, vaporization and temperature rise of the warm-up fuel can be accelerated, thereby enabling further reduction of the warm-up time. Moreover, at the time of a generating operation, water in the vaporized offgas can be supplied to the catalytic combustion chamber without being recondensed. Therefore condensed water can be reliably kept from flowing into the catalytic combustion chamber.

The starting catalyst warm-up apparatus may comprise an electric heater catalyst, and a catalyst warm-up fuel injection nozzle which injects fuel to the electric heater catalyst.

By having such a construction, warm-up of the catalytic combustion chamber at the time of startup can be reliably performed, with a simple construction.

DETAILED DESCRIPTION OF THE INVENTION

Embodiments of a fuel cell system according to the present invention will now be described with reference to FIG. 1 to FIG. 3. Each of the embodiment described below are aspects of a fuel cell system mounted in a fuel cell vehicle. However, the present invention is not limited to the application for vehicles. Furthermore, the present invention is not limited these embodiments, it is also possible to combine each element in the following embodiments.

[First Embodiment]

A first embodiment of the fuel cell system according to the present invention will first be described with reference to FIG. 1.

Figure 1:
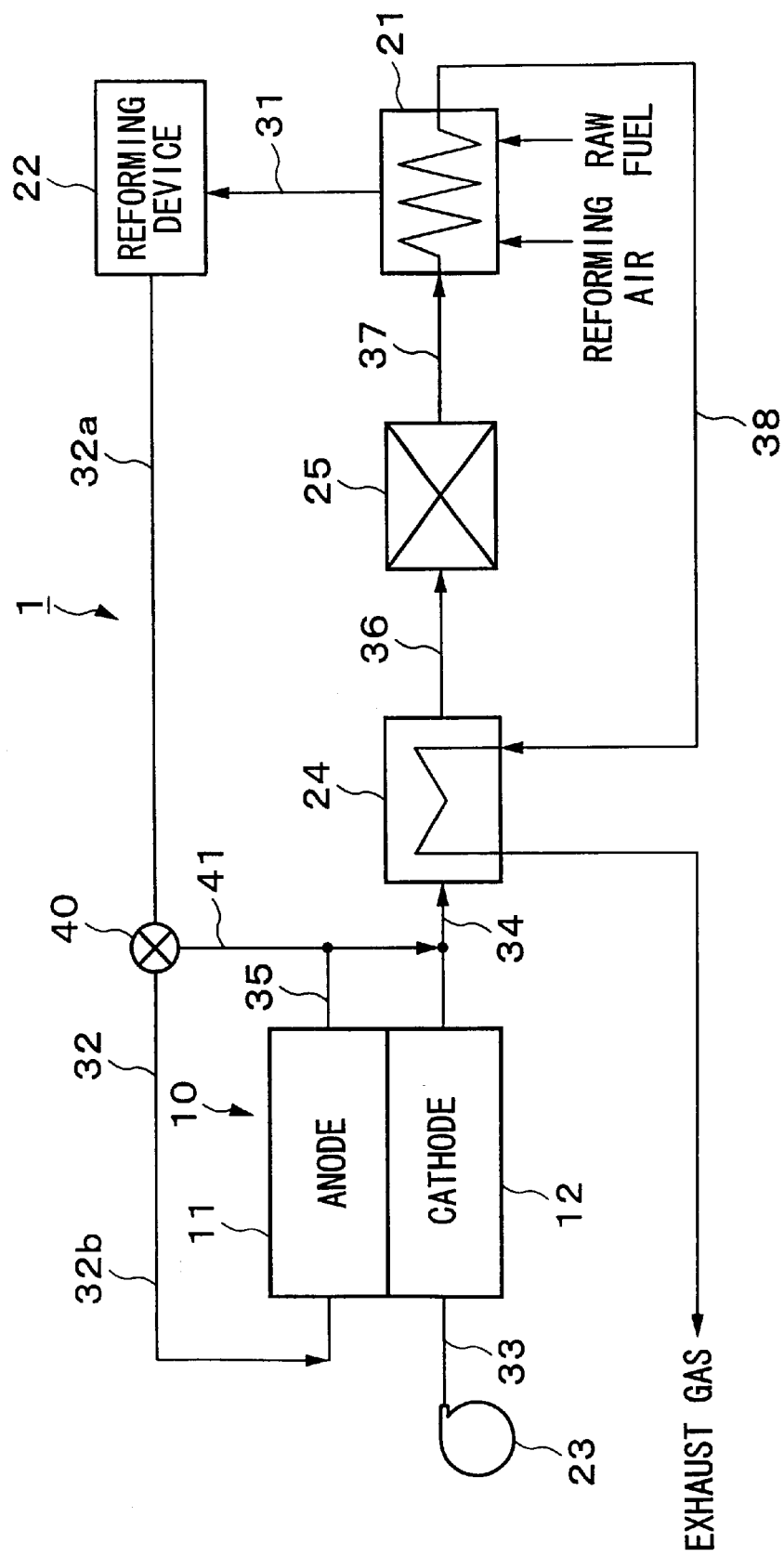
FIG. 1 is a block diagram for a first embodiment of a fuel cell system according to the present invention.
Figure 2:
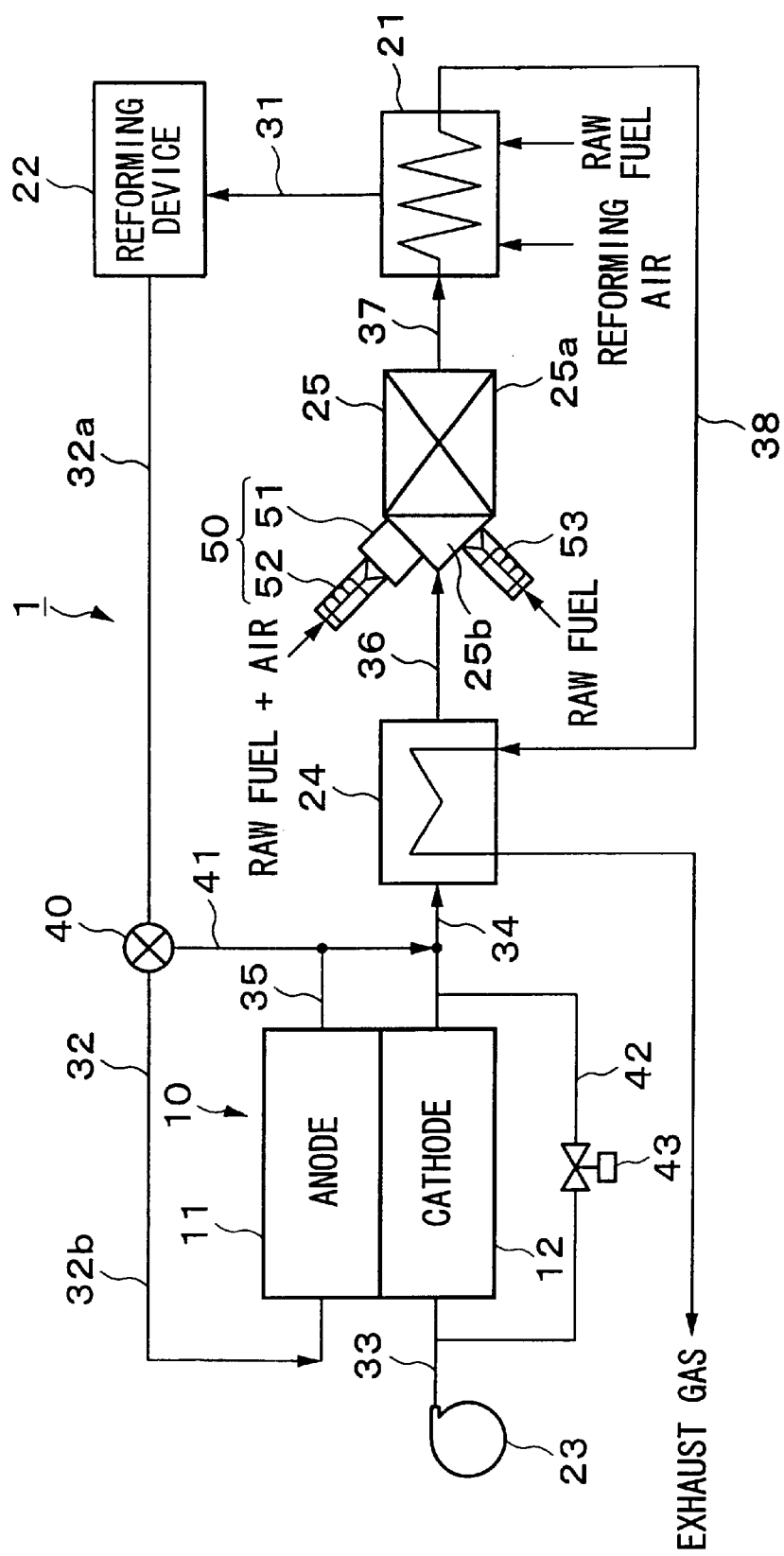
FIG. 2 is a block diagram for a second embodiment of a fuel cell system according to the present invention.

FIG. 1 is a block diagram of a fuel cell system 1 with a reforming reactor. The fuel cell system 1 is composed mainly of a fuel cell stack (solid polymer type fuel cell) 10, an evaporator (first heating device) 21, a reforming device 22, a supercharger 23, an offgas heating device (second heating device) 24, and a catalytic combustion chamber (combustion chamber) 25.

The fuel cell stack 10 is a solid polymer type fuel cell, and generates power by an electrochemical reaction of hydrogen in the fuel cell supplied to an anode electrode 11 side and oxygen in the air as an oxidant gas supplied to a cathode electrode 12 side. In this embodiment, the fuel gas and the air constitute a reactant gas supplied to the fuel cell.

As the fuel gas supplied to the anode electrode 11 side of the fuel cell stack 10, there is used one obtained by reforming a raw fuel to a fuel vapor by the evaporator 21 and then to a hydrogen-rich fuel gas by the reforming device 22.

That is to say, to the evaporator 21, there are supplied a reforming raw fuel obtained by mixing, for example, an alcohol fuel and a hydrocarbon fuel (methanol, gasoline, etc.) and water in a predetermined mixing ratio, and the air for reforming. In the evaporator 21, the reforming raw fuel and the reforming air are heated by heat exchange with a high-temperature combustion gas supplied from the catalytic combustion chamber 25 in a non-contacting state, and the reforming fuel is evaporated to become a fuel vapor, and is supplied to the reforming device 22 from the evaporator 21 via a fuel supply pipe 31, in a state of being mixed with the heated air.

The reforming device 22 is an auto-thermal type reforming device, which reacts the fuel vapor with the reforming air to reform it to a hydrogen-rich fuel gas. The reformed fuel gas is supplied to the anode electrode 11 side of the fuel cell stack 10 via a fuel gas supply pipe 32.

On the other hand, the air supplied to the cathode electrode 12 side of the fuel cell stack 10 is humidified by a humidifier (not shown) and supplied from the supercharger 23 via an air supply pipe 33.

The air supplied to the cathode electrode 12 side of the fuel cell stack 10 is used for power generation, and then supplied to the offgas heating device 24, as cathode offgas, via an offgas pipe 34. The fuel gas supplied to the anode electrode 11 side is used for power generation, and then supplied to the offgas heating device 24, as anode offgas, via an offgas pipe 35 and the offgas pipe 34.

The anode offgas and the cathode offgas (hereinafter, generally referred to as "offgas" in the case where particular discrimination is not necessary) are heated in the offgas heating device 24, and introduced to the catalytic combustion chamber 25 via an offgas pipe 36.

The catalytic combustion chamber 25 is for reacting (burning) hydrogen remaining in the anode offgas and oxygen remaining in the cathode offgas, and the burnt offgas, having reached a high temperature due to this reaction, is supplied to the evaporator 21 via an offgas pipe 37, as a heat source for heating the reforming raw fuel and the reforming air.

The burnt offgas cooled by means of heat exchange with the reforming raw fuel and the reforming air in the evaporator 21 is supplied to the offgas heating device 24, as a heat source for heating the offgas exhausted from the fuel cell stack 10, via an offgas pipe 38, and then discharged to the atmosphere as exhaust gas.

Moreover, along the fuel gas supply pipe 32, there is provided a three-way switchover valve 40, and this three-way switchover valve 40 is connected to the offgas pipe 35 via a by-pass pipe 41. The three-way switchover valve 40 is a switchover valve for enabling selective connection of a fuel gas supply pipe 32a on the upstream side of this three-way switchover valve 40 either to a fuel gas supply pipe 32b on the downstream side or the by-pass pipe 41. The three-way switchover valve 40 controls the switchover such that until warm-up of the reforming device 22 is completed, the gas sent out from the reforming device 22 is made to flow to the by-pass pipe 41 so as to by-pass the fuel cell stack 10, and after completion of warm-up of the reforming device 22, the gas sent out from the reforming device 22 is made to flow to the fuel cell stack 10.

Next, the operation of this fuel cell system 10 will be described.

At the time of a generating operation when the fuel cell stack 10 generates power, the burnt offgas introduced from the catalytic combustion chamber 25 to the evaporator 21 is cooled to 200 to 300° C. by means of heat exchange with the reforming raw fuel and the reforming air in the evaporator 21, and exhausted from the evaporator 21, and supplied as a heat source to the offgas heating device 24 via the offgas pipe 38.

On the other hand, as described above, the humidity of the offgas, particularly of the cathode offgas exhausted during power generation by the fuel cell stack 10, being a solid polymer type fuel cell, is very high, and the operating temperature of the fuel cell stack 10 is about 80° C. being around the dew point temperature of the cathode offgas. Moreover, this offgas is introduced to the offgas heating device 24 at a temperature of from 60 to 90° C.

As a result, in the offgas heating device 24, the offgas is heated to about 150 to 250° C. by means of heat exchange with the burnt offgas of a temperature of about 200 to 300° C. Therefore, even if moisture in the offgas is condensed to generate condensed water while the offgas flows from the fuel cell stack 10 to the offgas heating device 24, this condensed water can be completely vaporized in the offgas heating device 24. As a result, the condensed water can be prevented from flowing into the catalytic combustion chamber 25.

Accordingly, a part of the quantity of generated heat is not consumed in the catalytic combustion chamber 25 due to the latent heat of vaporization of water. Therefore it becomes possible to generate the quantity of heat at an appropriate temperature level necessary for evaporation of the raw fuel in the catalytic combustion chamber 25, and supply this to the evaporator 21.

Moreover, the burnt offgas exhausted from the evaporator 21 has been heretofore simply exhausted. However, in this fuel cell system 1, the waste heat in the burnt offgas is recovered to the offgas, and the recovered heat is added to the combustion heat of the catalytic combustion chamber 25, and then supplied to the evaporator 21. Therefore the energy recovery increases, and energy saving is promoted.

For example, when compared to the case where the offgas heating device 24 is not provided and heat and calories for the same temperature level are supplied to the evaporator 21, in the case where the offgas heating device 24 is provided, the feed rate of the anode offgas to the catalytic combustion chamber 25 can be reduced by 30 to 40%. That is, the fuel can be reduced.

[Second Embodiment]

Next, a second embodiment of the fuel cell system according to the present invention will be described with reference to FIG. 2. The point that is different in the fuel cell system 1 of the second embodiment to that of the first embodiment is as follows.

The catalytic combustion chamber 25 has a catalyst chamber 25a for accommodating the catalyst, and a heating chamber 25b provided on the upstream side of the catalyst chamber 25a, and the end of the downstream side of the offgas pipe 36 is connected to this heating chamber 25b.

Moreover, to the heating chamber 25b, there are connected towards (facing) the heating chamber 25b, a starting catalyst warm-up apparatus (starting catalyst warm-up device) 50 comprising an electric heater catalyst (hereinafter referred to as EHC) 51 and a first fuel injection nozzle (fuel injection nozzle for warming up the catalyst) 52 for injecting raw fuel and air to this EHC 51, and a second fuel injection nozzle (warm-up fuel supply device) 53 for injecting raw fuel directly to the catalyst chamber 25a of the catalytic combustion chamber 25. The starting catalyst warm-up apparatus 50 and the second fuel injection nozzle 53 are arranged in parallel with each other with respect to the offgas pipe 36. The raw fuel same as the raw fuel supplied to the evaporator 21 can be supplied to the first fuel injection nozzle 52 and the second fuel injection nozzle 53.

In this fuel cell system 1 of the second embodiment, an air supply pipe 33 and an offgas pipe 34 are connected by an air by-pass pipe 42, and a control valve 43 is provided along the air by-pass pipe 42. In this embodiment, a supercharger 23, the air by-pass pipe 42 and the control valve 43 constitute a warm-up air supply device for supplying the air for combustion of the catalytic combustion chamber 25 from the upstream side of the offgas heating device 24 (second heating device), at the time of startup of the system.

Other construction is the same as that of the first embodiment, and the same parts are denoted by the same reference symbols, and the description thereof is omitted.

Next, the operation of the fuel cell system 1 in this second embodiment will be described.

The fuel cell system 1 is automatically driven as described below, by a control unit for controlling the fuel cell (not shown) (hereinafter, abbreviated as "FCECU").

At first, the FCECU energizes the electric heater of the EHC 51 by an operation start signal of the fuel cell system 1, to heat the catalyst of the EHC 51, and injects the raw fuel and the air from the first fuel injection nozzle 52 to vaporize this raw fuel by the EHC 51, and effect catalytic combustion. Then, the combustion gas is supplied to the catalyst chamber 25a via the heating chamber 25b to heat the catalyst in the catalytic combustion chamber 25, to thereby warm up the catalyst. Accordingly, with the fuel cell system 1 in this second embodiment, warm-up of the catalytic combustion chamber 25 is performed without waiting for completion of warm-up of the offgas heating device 24. At this point of time, the three-way switchover valve 40 makes the fuel gas supply pipe 32a communicate with the by-pass pipe 41, and shuts off the fuel gas supply pipe 32b. Also, the raw fuel and the reforming air are not supplied to the evaporator 21.

In this manner, the catalytic combustion chamber 25 is warmed up, and when the catalyst in the catalytic combustion chamber 25 reaches the low activation temperature, injection of the raw fuel from the first fuel injection nozzle 52 is stopped, and the raw fuel is injected from the second fuel injection nozzle 53, to blow the fuel directly onto the surface of the catalyst in the catalyst chamber 25a through the heating chamber 25b. Also, by opening the control valve 43, the air for combustion is supplied to the catalytic combustion chamber 25 via the offgas pipe 34, the offgas heating device 24 and the offgas pipe 36. At the same time, the reforming air is supplied to the evaporator 21. At this point of time, the reforming raw fuel has not yet been supplied to the evaporator 21. Moreover, the three-way switchover valve 40 remains in the previous state, so that the gas sent out from the reforming device 22 is made to flow to the by-pass pipe 41.

As a result, the raw fuel injected from the second fuel injection nozzle 53 to the catalytic combustion chamber 25 is completely burnt in the catalytic combustion chamber 25, together with the air for combustion supplied from the supercharger 23. The generated high-temperature combustion gas is supplied to the offgas heating device 24 via the evaporator 21 and the offgas pipe 38, for warming up the offgas heating device 24. With progress of warm-up of the offgas heating device 24, heat exchange progresses between the combustion gas and the air for combustion at a normal temperature supplied from the supercharger 23, to thereby heat the air for combustion. The heated air for combustion is supplied to the heating chamber 25b of the catalytic combustion chamber 25, where the raw fuel injected from the second fuel injection nozzle 53 is heated.

In this manner, when the air for combustion supplied from the supercharger 23 is heated, the quantity of heat recovered from the combustion gas in the offgas heating device 24 is added to the heat output of the raw fuel in the catalytic combustion chamber 25, to be supplied to the evaporator 21. Therefore, the warm-up time of the evaporator 21 is reduced.

Moreover, when the raw fuel injected from the second fuel injection nozzle 53 is heated in this manner, vaporization and temperature rise of the raw fuel injected from the second fuel injection nozzle 53 is accelerated. Therefore, even in the case where the injection quantity of the raw fuel from the second fuel injection nozzle 53 is increased, liquid raw fuel is not accumulated immediately on the upstream side of the catalyst in the catalytic combustion chamber 25. Also, the time until the raw fuel injected from the catalytic combustion chamber 25 reaches the burnt condition is reduced, and unburnt raw fuel is not discharged from the catalytic combustion chamber 25. Therefore complete combustion becomes possible in the catalytic combustion chamber 25. Furthermore, since vaporization of the raw fuel is accelerated, the raw fuel in the catalyst chamber 25a can be well dispersed, thereby making it difficult for hot spots to occur in the catalyst in the catalytic combustion chamber 25.

Furthermore, even when warm-up of the evaporator 21 is performed as described above, the reforming air is heated by the combustion gas exhausted from the catalytic combustion chamber 25, in the evaporator 21. Then, the heated reforming air is introduced to the offgas pipe 34 through the reforming device 22, the fuel gas supply pipe 32a, the by-pass pipe 41 and the offgas pipe 35, where it is joined with the air for combustion supplied from the supercharger 23. On the other hand, the combustion gas having heated the reforming air is introduced to the offgas heating device 24 from the evaporator 21 through the offgas pipe 38, and then exhausted.

When the reforming air exhausted from the evaporator 21 reaches a predetermined temperature, supply of the reforming raw fuel to the evaporator 21 is started, to continue the warm-up operation of the evaporator 21. When the vapor temperature of the reforming raw fuel sent out from the evaporator 21 reaches a temperature at which this can be supplied to the reforming device 22, injection of the raw fuel from the second fuel injection nozzle 53 is stopped to complete warm-up of the evaporator 21, and subsequently operation shifts to the warm-up operation of the reforming device 22. When warm-up of the reforming device 22 is completed, the three-way switchover valve 40 shuts off the by-pass pipe 41, to make the fuel gas supply pipes 32a and 32b communicate with each other, and the control valve 43 is then shut. As a result, the fuel gas reformed by the reforming device 22 is supplied to the anode electrode 11 side, and air is supplied to the cathode electrode 12 side, of the fuel cell stack 10, so that the fuel cell stack 10 can generate power.

After the fuel cell stack 10 attains a state capable of generating power, the same operation and effects as those of the fuel cell system 1 in the first embodiment described above are exhibited in the fuel cell system 1 in this second embodiment.

In this manner, in the fuel cell system 1 in this second embodiment, in addition to the operation and effects of the fuel cell system 1 in the first embodiment, early warm-up of the evaporator 21 becomes possible. As a result, the fuel vapor can be supplied to the reforming device 22 earlier, to accelerate warm-up of the reforming device 22, thereby enabling acceleration of early warm-up of the fuel cell system 1.

[Third Embodiment]

A third embodiment of the fuel cell system according to the present invention will now be described with reference to FIG. 3. The third embodiment can be said to be a variation example of the fuel cell system 1 in the second embodiment, and can also be said to be a more specific configuration example.

Figure 3:
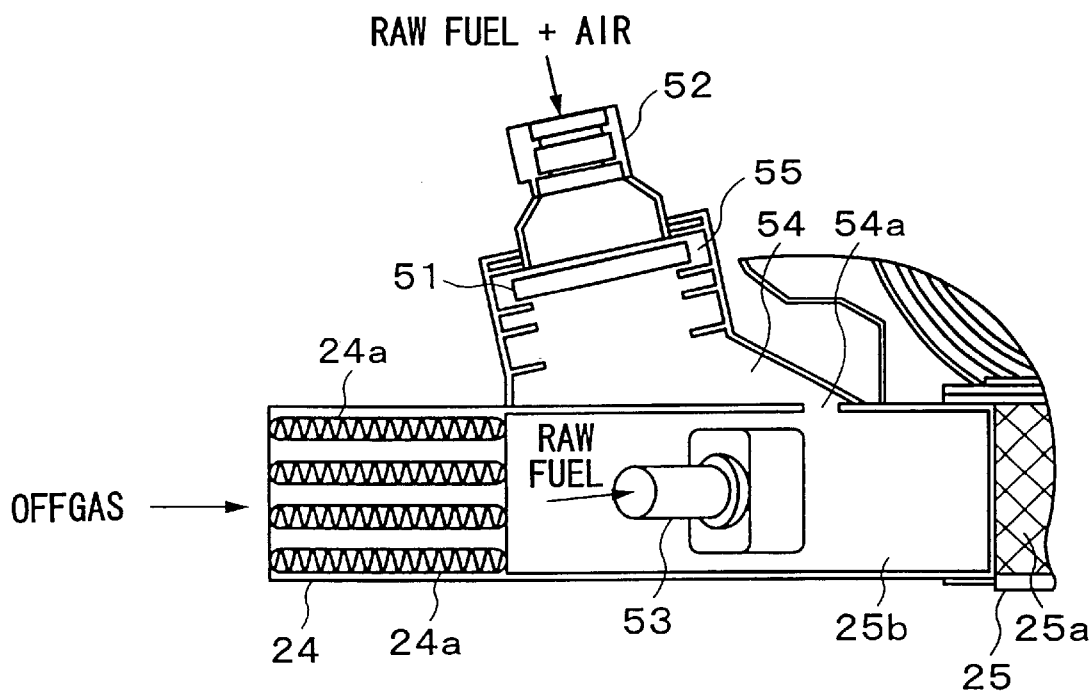
FIG. 3 is a sectional view showing the main part in a third embodiment of a fuel cell system according to the present invention.

FIG. 3 is a sectional view showing the vicinity of an offgas heating device 24 and a heating chamber 25b of a catalytic combustion chamber 25, in the fuel cell system 1 in the third embodiment.

The offgas heating device 24 is a stacked heat exchanger, wherein a plurality of passages 24a where the burnt offgas exhausted from the evaporator 21 circulates, is laminated on each other with a space, and the burnt offgas exhausted from the fuel cell stack 10 circulates between these passages 24a.

The heating chamber 25b of the catalytic combustion chamber 25 is directly connected to this offgas heating device 24, and therefore, in the case of this third embodiment, the offgas pipe 36 in the second embodiment is not provided.

On one side on the outer periphery of the heating chamber 25b, there is adjacently provided a startup combustion gas chamber 54 of the starting catalyst warm-up apparatus 50, so that the heating chamber 25b and the startup combustion gas chamber 54 are communicated with each other. That is to say, the startup combustion gas chamber 54 of the starting catalyst warm-up apparatus 50 is provided facing the heating chamber 25b. An EHC chamber 55 is provided adjacent to the startup combustion gas chamber 54, and an EHC 51 is housed in the EHC chamber 55. Moreover, a first fuel injection nozzle 52 is installed in an upper end portion of the EHC chamber 55.

The raw fuel and air injected from the first fuel injection nozzle 52 are injected to the EHC 51 in the EHC chamber 55, and catalytically combusted in the EHC 51. The combustion gas flows out from the EHC chamber 55 to the startup combustion gas chamber 54, and further to the heating chamber 25b via a continuous hole 54a, and is then introduced into a catalyst chamber 25a.

On an other side on the outer periphery of the heating chamber 25b, there is installed a second fuel injection nozzle 53 so that the fuel can be directly injected to the catalyst in the catalyst chamber 25a of the catalytic combustion chamber 25. That is, the second fuel injection nozzle 53 is provided so as to face the heating chamber 25b.

In this third embodiment, by setting the length in the gas flowing direction of the heating chamber 25b as small as possible, the offgas heating device 24 and the catalyst chamber 25a of the catalytic combustion chamber 25 can be arranged in close proximity to each other, and the quantity of heat of the air for combustion or the offgas, heated by the offgas heating device 24 can be supplied to the catalytic combustion chamber 25 without decreasing the quantity thereof.

Accordingly, at the time of warm-up operation of the fuel cell system 1, vaporization and temperature rise of the fuel injected from the second fuel injection nozzle 53 can be further accelerated, thereby enabling further reduction in the warm-up time.

Moreover, at the time of power generation of the fuel cell system 1, after the moisture in the offgas is vaporized by the offgas heating device 24, the vaporized moisture can be supplied to the catalytic combustion chamber 25 in the gaseous state, without re-condensing the vaporized moisture.

Other construction is the same as that of the second embodiment.

What is claimed is:

1. A fuel cell system comprising:
    a solid polymer type fuel cell, to which a reactant gas is supplied to generate power;
    a combustion chamber which burns offgas exhausted from said fuel cell to generate a combustion gas;
    a first heating device which heats an object to be heated, by using heat of said combustion gas; and
    a second heating device which provides heat to said offgas by absorbing heat from combustion gas exhausted from said first heating device, on an upstream side of said combustion chamber.

2. A fuel cell system according to claim 1, wherein said object to be heated is raw fuel of said reactant gas, and said first heating device is an evaporator which evaporates said raw fuel.

3. A fuel cell system according to claim 2, further comprising a switchover valve which selects one of a first passage transmitting reactant gas heated by said first heating device to said solid polymer type fuel cell, and a second passage transmitting said reactant gas heated by said first heating device to said second heating device.

4. A fuel cell system according to claim 2, further comprising a reforming device which reforms said raw fuel heated by said first heating device to a hydrogen-rich fuel gas.

5. A fuel cell system according to claim 1, further comprising:
    a warm-up air supply device which supplies air for combustion of said combustion chamber from an upstream side of said second heating device, at the time of system startup; and
    a warm-up fuel supply device which supplies warm-up fuel to said combustion chamber, at the time of system startup.

6. A fuel cell system according to claim 5, wherein said combustion chamber is a catalytic combustion chamber, and there is provided a starting catalyst warm-up device which warms up said catalytic combustion chamber at the time of system startup, and said warm-up fuel supply device comprises a fuel injection nozzle which directly injects fuel to a catalyst in said catalytic combustion chamber.

7. A fuel cell system according to claim 6, wherein said catalytic combustion chamber comprises a catalytic chamber for housing a catalyst and a heating chamber adjacently provided on an upstream side of said catalytic chamber, said second heating device is directly connected to said heating chamber, and said starting catalyst warm-up device and said fuel injection nozzle of said warm-up fuel supply device are installed, facing said heating chamber.

8. A fuel cell system according to claim 6, wherein said starting catalyst warm-up apparatus comprises an electric heater catalyst, and a catalyst warm-up fuel injection nozzle which injects fuel to said electric heater catalyst.

9. A fuel cell system according to claim 5, wherein said warm-up fuel supply device comprises a supercharger which supplies air to said solid polymer type fuel cell and a bypass valve which can supply air from said supercharger to said second heating device.

* * * * *